United States Patent [19]

Aughton

[11] 4,237,481
[45] Dec. 2, 1980

[54] IMAGE REPRODUCTION USING SHARP AND UNSHARP SIGNALS

[75] Inventor: John E. Aughton, London, England

[73] Assignee: Crosfield Electronics, Ltd., London, England

[21] Appl. No.: 77,225

[22] Filed: Sep. 20, 1979

[30] Foreign Application Priority Data

Sep. 26, 1978 [GB] United Kingdom ............... 38154/78

[51] Int. Cl.³ .............................................. H04N 1/40
[52] U.S. Cl. ...................................... 358/80; 358/284
[58] Field of Search ................... 358/75, 80, 280, 282, 358/283, 284

[56] References Cited

U.S. PATENT DOCUMENTS

| | | | |
|---|---|---|---|
| 2,691,696 | 10/1954 | Yule | 358/80 |
| 2,721,892 | 10/1955 | Yule | 358/80 |
| 2,962,548 | 11/1960 | Taudt | 358/284 |

*Primary Examiner*—Robert L. Griffin
*Assistant Examiner*—Joseph A. Orsino, Jr.

*Attorney, Agent, or Firm*—Sughrue, Rothwell, Mion, Zinn and Macpeak

[57] ABSTRACT

This relates to a method of image reproduction in which detail enhancement is carried out using sharp and unsharp signals (S and U), for example in accordance with the expression $$P = K (\log U - \log S) - \log S$$

where P is the derived picture signal and K is a constant. To reduce the disparity between the fringe amplitudes and steepness on the two sides of a density boundary, the above expression is modified, in accordance with the invention to $$P = K \{\log[U + L (U - S)]\} - (K + 1) \log S.$$

Another expression involving the same subtractions of sharp and unsharp signals as the first expression above but in a form suitable for use with signals which have been compressed to represent luminance, is modified in accordance with the invention in a similar way.

8 Claims, 3 Drawing Figures

1  K = 0
2  K = 0·5
3  K = 1

1  K=0
2  K=0.5
3  K=1

IMAGE REPRODUCTION USING SHARP AND UNSHARP SIGNALS

A method of detail enhancement known as "unsharp masking" has been known for many years in photographic processing and has also been used in scanning electro-optical systems of image reproduction. In photographic processing, starting with a normal negative, unsharp masking involves initially making a positive of the same size and same density range but less sharp, for example by exposure through a diffuser (the "unsharp" mask). The negative and positive are then superposed and a further exposure is made. The resultant "mask" will show only the fine detail of the negative, all flat areas remaining unexposed, and will resemble a line drawing. This mask is then superposed with the original negative and re-exposed. The resultant will have a sharper appearance than the original. In electronic image signal processing, essentially the same steps have been followed. The element of the image which is subject to analysis by the scanner at any instant is "viewed" by the scanner through an aperture of the size required for the detail to be reproduced and through an aperture of larger size, giving "sharp" and "unsharp" signals. These two signals are combined in opposite senses. Because the larger aperture, as it scans across the image element to be reproduced, sees a sharp transition in transmittance before the smaller aperture sees the transition, and continues to have the transition in its field after the smaller aperture has left the transition, the effect of this combination in opposite senses is to provide a high-contrast boundary signal having a light "fringe" on one side and dark "fringe" on the other side. This signal, which represents only the fine detail and not the "flat" areas, is then combined with the original sharp signal to provide enhanced contrast for edges and details. Thus, in the resultant reproduction, at a boundary between a light grey area and a black area a narrow fringe or band lighter than the light grey colour is present on the light side of the boundary and a narrow fringe or band of a more intense black is present on the dark side of the boundary.

In general terms, this boundary enhancement process can be expressed as subtracting a function of the sharp signal from a corresponding function of the unsharp signal, and subtracting the said function of the sharp signal from a multiple of the said difference.

Mathematically, for an image reproduction system in which derived "transmittance" signals are initially passed through a logarithmic circuit to give density-representing signals, the unsharp masking algorithm may be defined as follows:

$$P = K(\log U - \log S) - \log S$$

where

K controls the amount of unsharp masking which is added, and

U = Signal received by unsharp photomultiplier
S = Signal received by sharp photomultiplier
P = Picture signal after logging and applying U.S.M.

The signal processing can also be carried out on signals which have been compressed to provide signals which represent the luminance of the original scene. In this case, instead of dealing with the logarithm of the photomultiplier signal, we deal with a function of the signal which has the form: $CX^m$, where X is the result of subtracting a residual sharp or unsharp signal $S_o$ or $U_o$ from a sharp signal $S_a$ or $U_a$ obtained during image reproduction, and C is constant.

In this case, the unsharp masking algorithm may be expressed in the following form:

$$P = KC_1 U^m - (1+K) C_2 S^m$$

in which $U = U_a - U_o$ and $S = S_a - S_o$

However, when such systems are put into practice, some defects are noticeable. In particular, the fringe amplitude on the low density side is always much less than the fringe amplitude on the high density side of a density step, particularly if the density step is large. Also, the dark side fringe has an abrupt appearance.

In a method of image reproduction according to the present invention, a picture signal used to form the reproduction is derived from sharp and unsharp signals by subtracting the sharp signal from the unsharp signal to obtain a first difference, adding a multiple between 0.4 and 2.0 of this first difference to the unsharp signal to obtain a first sum, subtracting a multiple (1+K) of a predetermined function of the sharp signal from a multiple K of the same function of the said first sum, the resulting picture signal being thereafter used with or without tone and/or colour correction to control the reproduction of the image.

The above-described method is applicable to both monochrome and coloured image reproduction. In the case of coloured image reproduction however, the sharp signal used in one part of the method embodying the present invention may be that of a different colour channel. In coloured image reproduction, therefore, a method according to the invention comprises subtracting the sharp signal for a given colour component from the unsharp signal to obtain a first difference; adding a multiple between 0.4 and 2.0 of this first difference to the unsharp signal to obtain a first sum; and subtracting, from K times a predetermined function of the said first sum, the sum of K times the same function of the said sharp signal and same function of the sharp signal of the same or a different colour channel; the resulting colour-component signal being thereafter used with or without tone and/or colour correction to control the reproduction of the colour printer.

Where transmittance signals are first passed through a logarithmic circuit, the predetermined function is of logarithmic form and the algorithm is of the form $$P = K\{\log[U + L(U-S)] - \log S\} - \log S,$$

where L is between 0.4 and 2.0. Where the predetermined function is of the form $C(S - S_o)^m$. In this case the algorithm is of the form $$P = K\{ <C_1(U-U_o) + L[C_1(U-U_o) - C_2(S-S_o)]>^m - C_2(S-S_o)^m\} - C_2(S-S_o)^m$$

where L is between 0.4 and 2.0.

In order that the invention may be better understood, comparative waveforms for the known unsharp masking system and the system embodying the present invention are shown in the accompanying drawings, in which.

Figure 1:
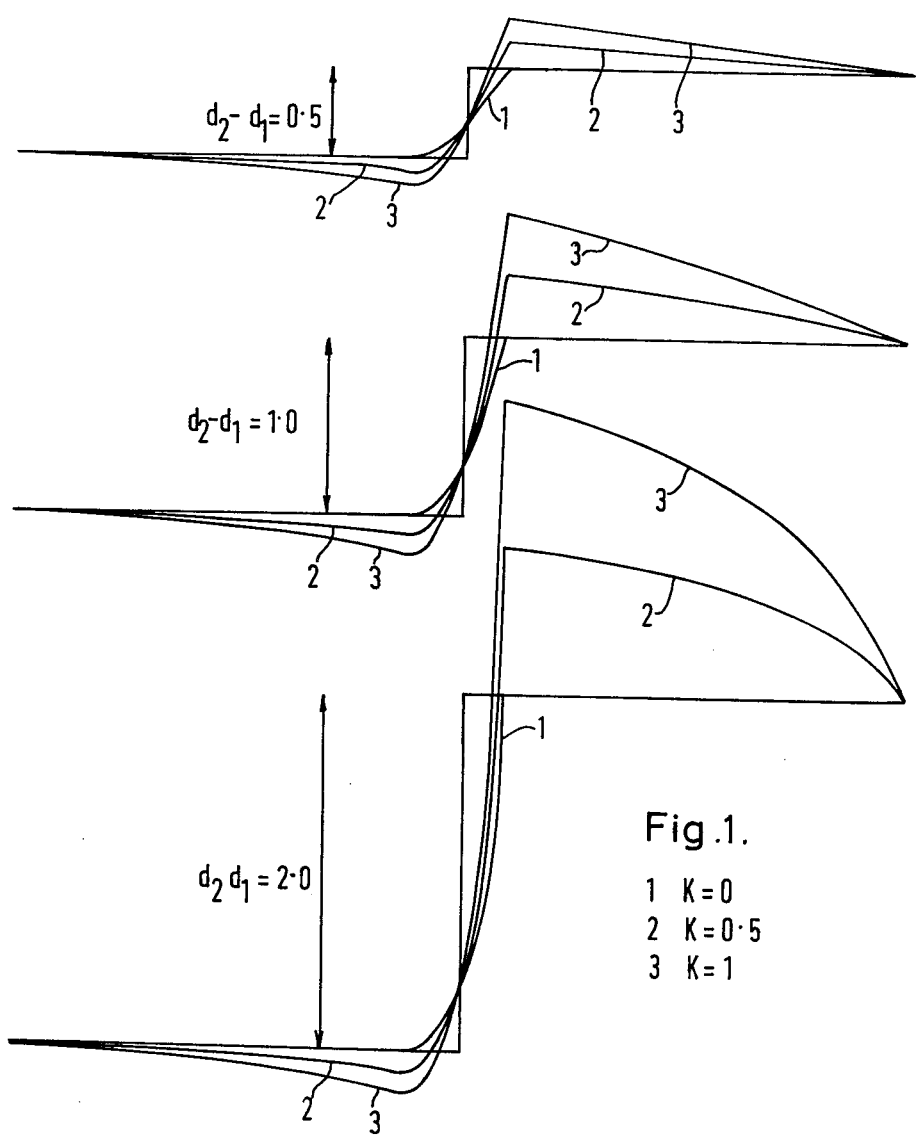
FIG. 1 illustrates picture signals obtained with the known algorithm.

In FIG. 1, there are three sets of waveforms for different values of density step (0.5, 1.0 and 2.0). In each set, there are waveforms for K=0, K=0.5, and K=1. The ratio of unsharp aperture diameter to sharp aperture diameter for FIG. 1 is 10. Reducing this ratio reduces the widths of the "fringes" on each side of the boundary.

As will be seen from FIG. 1, the fringe height on the low density side is always much less than that on the high density side of the step and this is particularly noticeable where the step is large. Also, the dark side fringe is very steep, much steeper than the fringe on the low density side.

Figure 2:
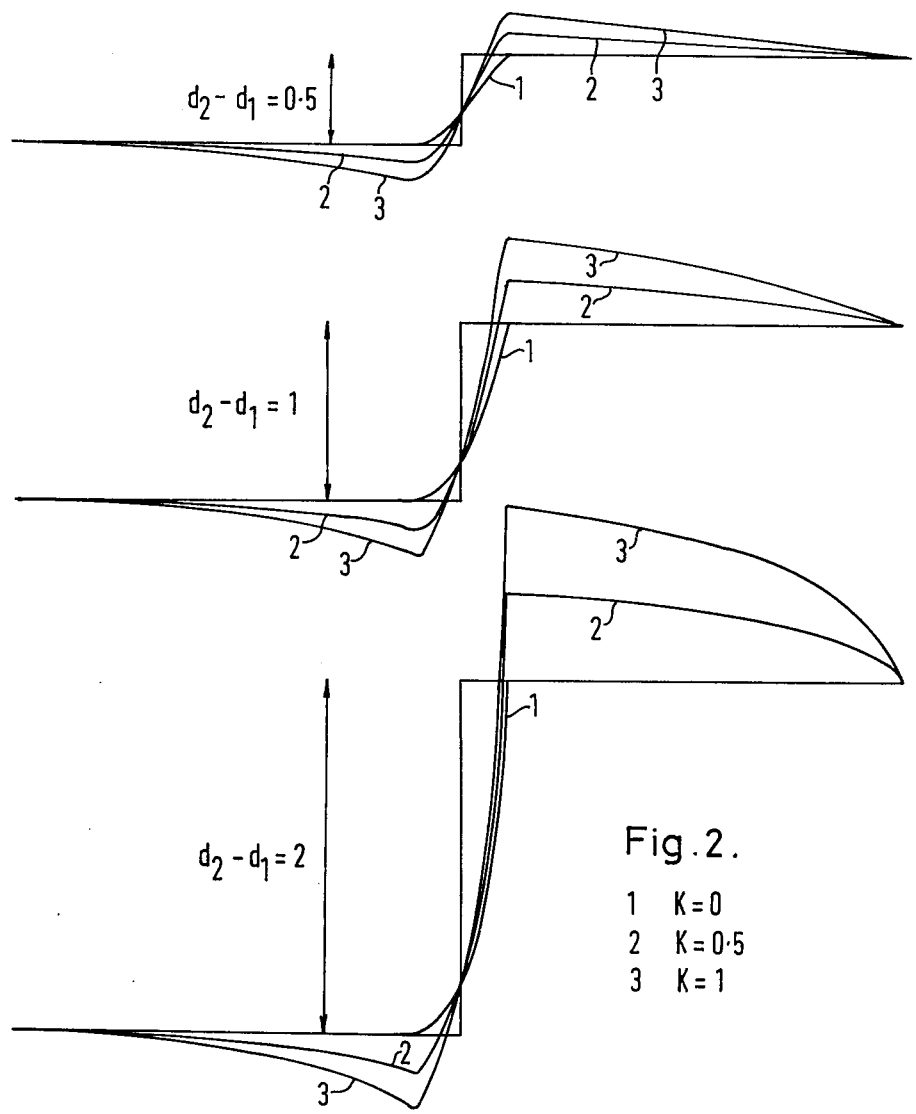
FIG. 2 shows the corresponding picture signals obtained when the algorithm used in the method according to the present invention is employed.

FIG. 2 shows the corresponding waveforms derived for the same aperture diameter ratio and for the same values of density step and of K, when the algorithm used for unsharp masking is in accordance with the present invention and where L in this algorithm equal 1. It will be clear that the waveforms derived are much closer to the ideal than those shown in FIG. 1.

As stated above, the value of L will normally be chosen to be between 0.4 and 2. The maximum value of L depends on the ratio of the unsharp aperture diameter to the sharp diameter. For example, if this ratio is 3, L can be 2. However, the diameter ratio of 3 is small for most practical purposes. If it is 30, a value of 1 would be suitable for L.

It will be seen that the invention reduces the difficulties inherent in a system in which the unsharp detector is responsive to the mean transmittance of the area which it sees and in which the logarithms of both signals are subsequently taken.

Where colour reproductions are required, it is frequently possible to use a single one of the colour-component channel signals as the sharp signal for all colour-component channels. In such a case, the expression given above is modified only in that in the final term, S is replaced by $S^1$, where $S^1$ is the signal received from the detector in the relevant colour channel.

Figure 3:
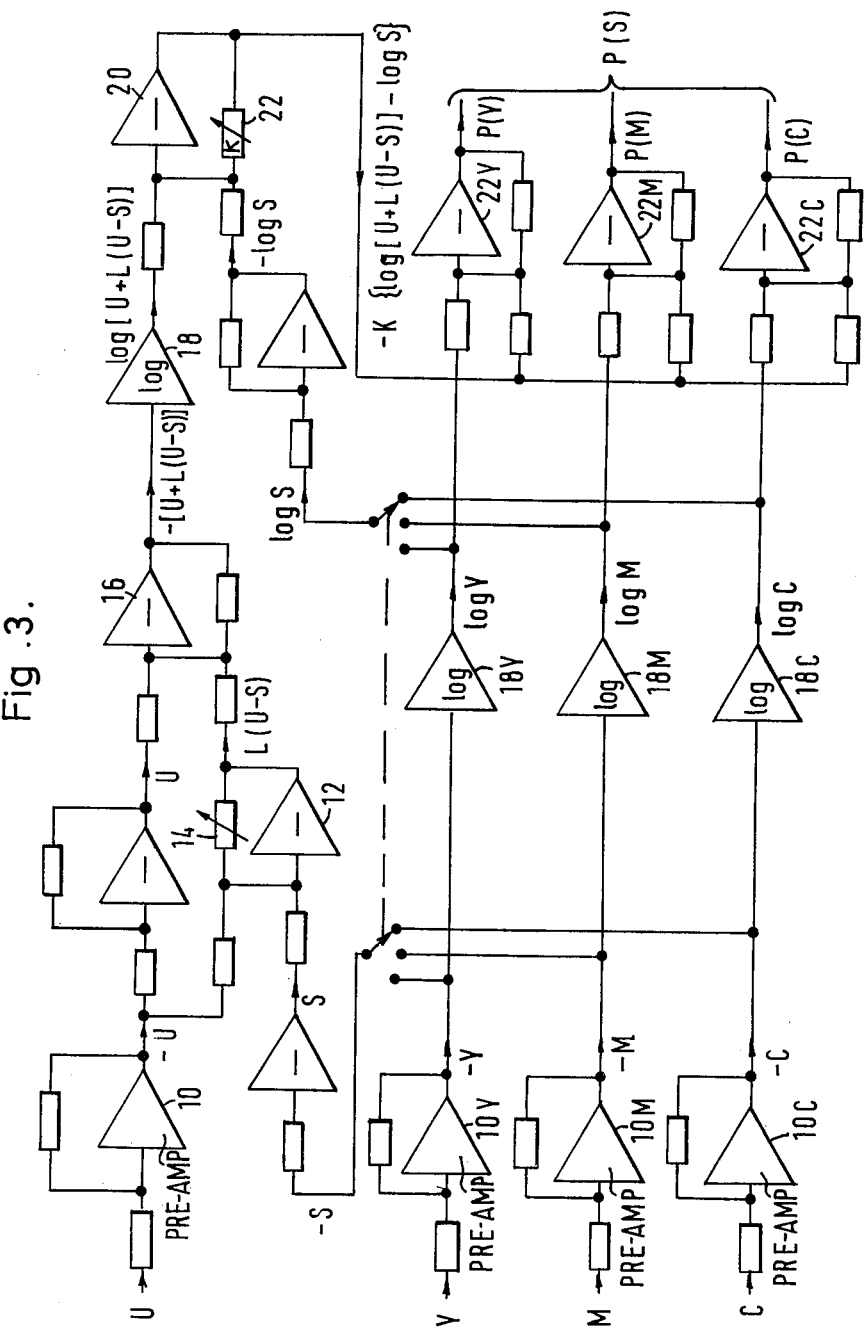
FIG. 3 shows the calculating circuits.

One form of apparatus for carrying out the method according to the invention for three colour-component signals is shown in FIG. 3 of the drawings. In FIG. 3, an unsharp signal U is passed through an inverting pre-amplifier 10 to an inverting summing amplifier 12 which also receives an output from one of the three inverting pre-amplifiers 10Y, 10M and 10C, which receive respectively the sharp yellow, magenta and cyan signals. In the following description the sharp colour-component signal will be represented by S. The amplifier 12 has a variable resistor 14 connected between its output and input, the adjustment of this variable resistor setting the value of the factor L. The output of the amplifier 12, which is $L(U-S)$ is added to the unsharp signal U in amplifier 16, which also inverts the sum. This signal passes through a logarithmic amplifier 18. The sharp signals in the colour-component channels are aslo passed through logarithmic amplifiers 18Y, 18M and 18C. The selected sharp signal in logarithmic form wil be called log S in the following. In amplifier 20, the signal log S is subtracted from the output of amplifier 18 and a feedback resistor 22 permits adjustment of a proportionality factor K. Finally, the logarithmic sharp signal is subtracted in amplifier 22Y, 22M or 22C, whichever is appropriate, from the output of amplifier 20 to provide the output signal $$P = K\{\log[U+L(U-S)] - \log S\} - \log S.$$

It will of course be appreciated that the invention can also be implemented using a computer and software to obtain the required algorithms. It is believed that the nature of the software required will be obvious from a consideration of the calculating circuits shown in FIG. 3.

As explained above, in the final subtraction in FIG. 3, it is not essential that the sharp signal whose logarithm is subtracted in amplifier 22Y, 22M or 22E is the same sharp signal selected by the selection switches; it would be possible to use the sharp signal of a different colour channel at this stage.

I claim:

1. A method of image reproduction, in which a picture signal used to form the reproduction is derived from sharp and unsharp signals by subtracting the sharp signal from the unsharp signal to obtain a first difference, adding a multiple between 0.4 and 2.0 of this first difference to the unsharp signal to obtain a first sum, subtracting a multiple (1+K) of a predetermined function of the sharp signal from a multiple K of the same function of the said first sum, the resulting picture signal being thereafter used with or without tone and/or colour correction to control the reproduction of the image.

2. A method of reproducing coloured images, in which a colour-component signal used to form a colour-component printer is derived from sharp and unsharp signals by: subtracting the sharp signal for that colour component from the unsharp signal to obtain a first difference; adding a multiple between 0.4 and 2.0 of this first difference to the unsharp signal to obtain a first sum; and subtracting, from K times a predetermined function of the said first sum, the sum of K times the same function of the said sharp signal and same function of the sharp signal of the same or a different colour channel; the resulting colour-component signal being thereafter used with or without tone and/or colour correction to control the reproduction of the colour printer.

3. A method in accordance with claim 1 or 2, in which the said predetermined function of a signal is the logarithm of that signal and the picture signal is derived in accordance with the algorithm $$P = K\{\log[U+L(U-S)]\} - K \log S - \log S_1,$$

where L is between 0.4 and 2.0, U and S are the unsharp and sharp signal values, K is a constant, and where for monochrome pictures $S_1 = S$ and for colour pictures $S_1$ may equal S or may be the sharp signal for a different colour component channel.

4. A method in accordance with claim 1 or 2, in which the predetermined function is of the form $CX^m$, where X is the result of subtracting a residual signal level $X_o$ from the signal level $X_a$ obtained during image reproduction and C is a constant, and the picture signal is derived in accordance with the algorithm $$P = KC\{U+L(U-S)\}^m - KCS^m - CS_1^m$$

where L is between 0.4 and 2.0, U and S are the unsharp and sharp signal values, K is a constant, and where for monochrome pictures $S_1 = S$ and for colour pictures $S_1$ may equal S or may be the sharp signal for a different colour component channel.

5. Scanning electro-optical image reproduction equipment for carrying out the method of claim 3, including image analysis means for deriving sharp and unsharp signals, and calculating means operating in accordance with the algorithm $$P = K\{\log[U + L(U-S)]\} - K \log S - \log S_1,$$

and means responsive to the resultant signal P or a function thereof for controlling the formation of an image reproduction.

6. Scanning electro-optical image reproduction equipment for carrying out the method of claim 4, including image analysing means for deriving sharp and unsharp signals, and calculating means operating in accordance with the algorithm $$P = KC\{U + L(U-S)\}^m - KCS^m - CS_1^m$$

and means responsive to the said resultant signal P or a function thereof for controlling the formation of an image reproduction.

7. Scanning electro-optical image reproduction equipment including image analysis means for deriving sharp and unsharp signals, means for subtracting the sharp signal from the unsharp signal to obtain a first difference signal; means for adding a multiple of this first difference signal to the unsharp signal to obtain a first sum signal, the said multiple being between 0.4 and 2; means for subtracting a multiple (1+K) of a predetermined function of the sharp signal from a multiple K of the same function of the said first sum signal; and means responsive to the resultant signal for controlling the formation of an image reproduction.

8. Scanning electro-optical image reproduction equipment for reproducing coloured images including image analysing means for deriving sharp and unsharp signals, means for subtracting the sharp signal from the unsharp signal to obtain a first difference signal; means for adding a multiple of this first difference signal to the unsharp signal to obtain a first sum signal, the said multiple being between 0.4 and 2; means for subtracting, from K times a predetermined function of the said first sum signal, the sum of K times the same function of the said sharp signal and the same function of the sharp signal of the same or a different colour; and means responsive to the resultant signal for controlling the formation of an image reproduction.

* * * * *